Sept. 23, 1952             J. G. YATES             2,611,811
ELECTRICAL MEASUREMENT OF PHYSICAL EFFECTS, FOR
EXAMPLE MECHANICAL STRAINS
Filed Aug. 10, 1948             5 Sheets-Sheet 1

INVENTOR: James Garrett Yates.

by:             Attorney.

INVENTOR:
James Garrett Yates.
Attorney.

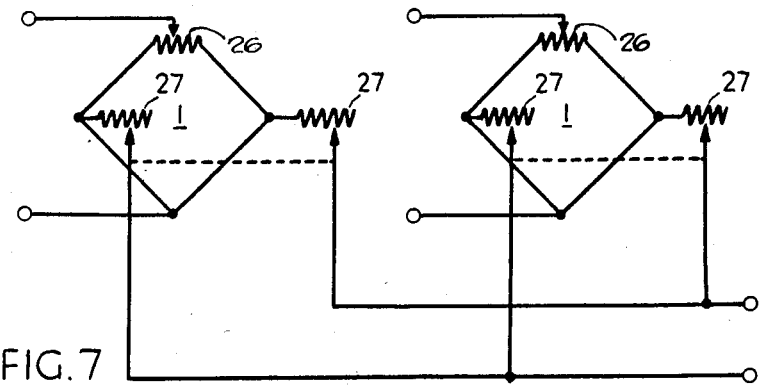
FIG.7
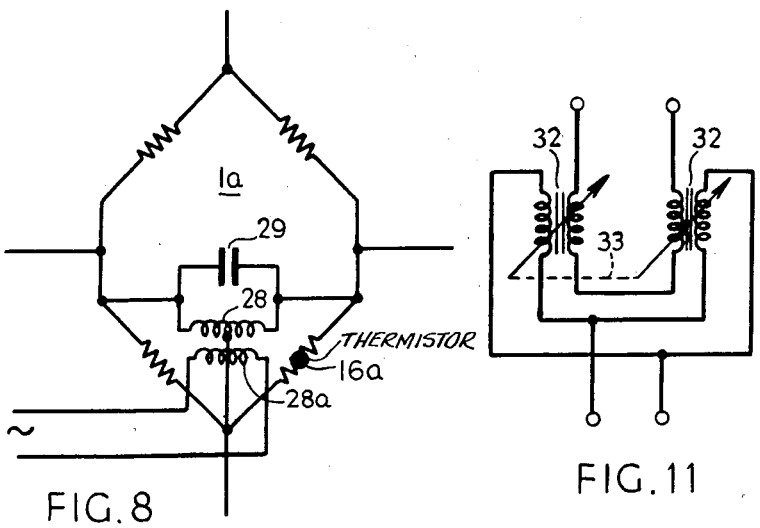
FIG.8
FIG.11
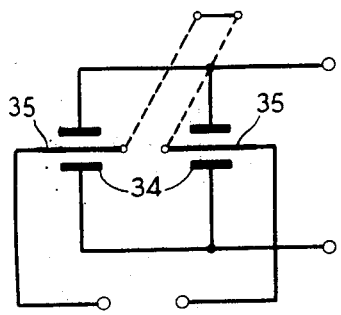
FIG.12

Sept. 23, 1952         J. G. YATES         2,611,811
ELECTRICAL MEASUREMENT OF PHYSICAL EFFECTS, FOR
EXAMPLE MECHANICAL STRAINS
Filed Aug. 10, 1948         5 Sheets-Sheet 4
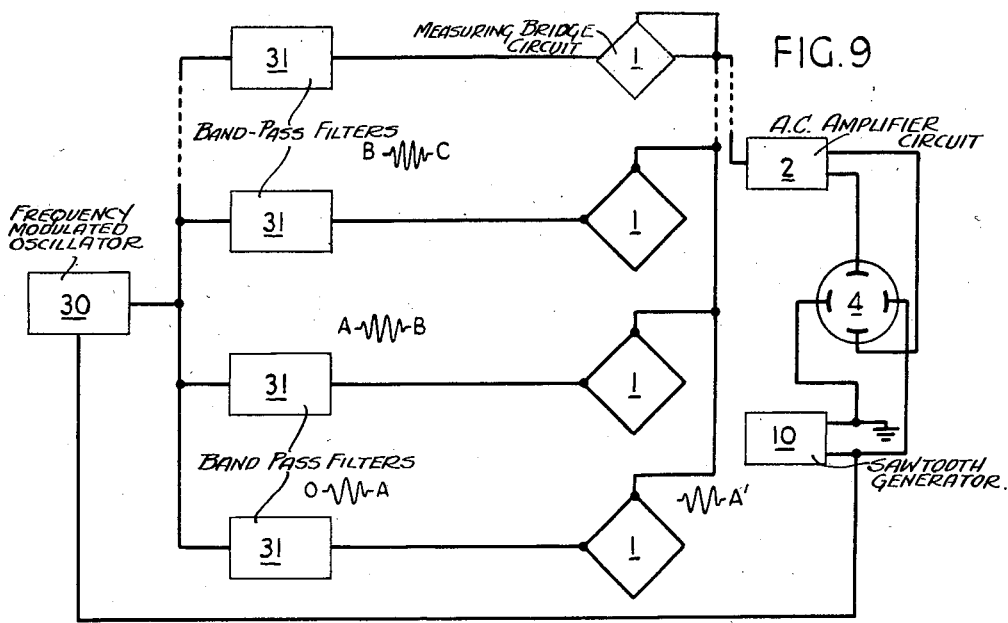
FIG. 9
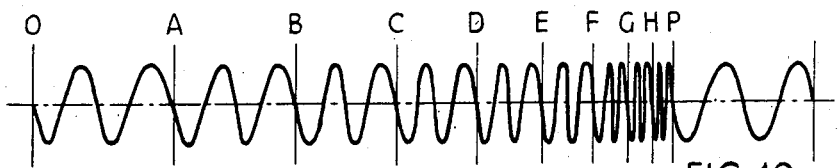
FIG. 10A
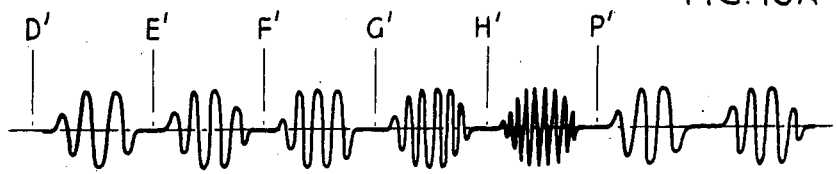
FIG. 10B
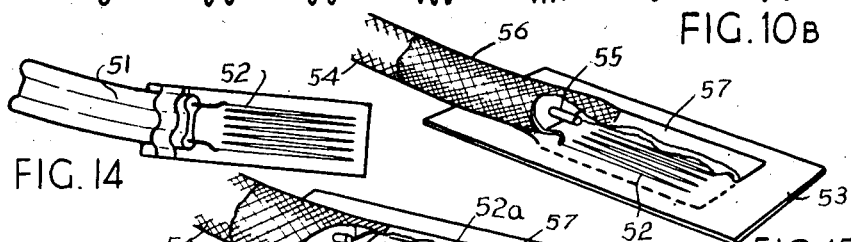
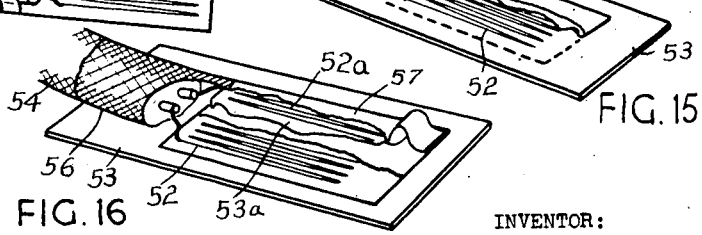
INVENTOR:
James Garrett Yates.
by *[signature]*
Attorney.

Sept. 23, 1952               J. G. YATES              2,611,811
ELECTRICAL MEASUREMENT OF PHYSICAL EFFECTS, FOR
EXAMPLE MECHANICAL STRAINS
Filed Aug. 10, 1948                        5 Sheets-Sheet 5
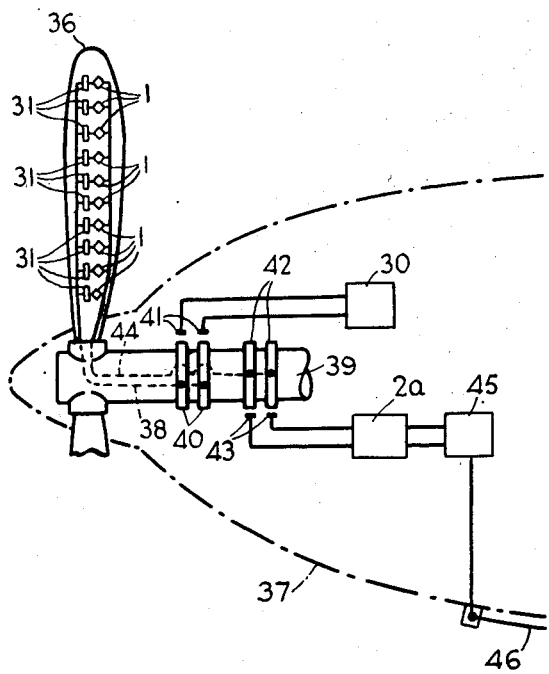
FIG. 13
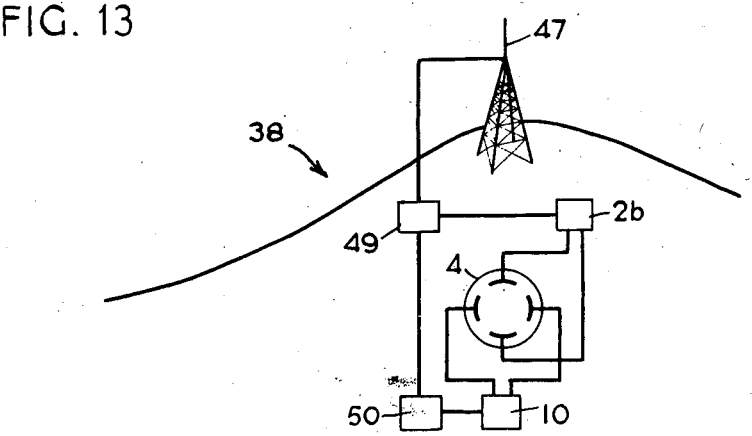
INVENTOR: James Garrett Yates.
by: *[signature]*
             Attorney.

Patented Sept. 23, 1952

2,611,811

UNITED STATES PATENT OFFICE 2,611,811

ELECTRICAL MEASUREMENT OF PHYSICAL EFFECTS, FOR EXAMPLE MECHANICAL STRAINS

James Garrett Yates, Cambridge, England

Application August 10, 1948, Serial No. 43,464
In Great Britain August 15, 1947

10 Claims. (Cl. 177—351)

This invention concerns the electrical measurement of physical effects by means of transducer devices which exhibit a change of an electrical characteristic in response to a change in the physical effects being measured. Such devices may be of a complex construction—e. g. a capacity microphone or a gramophone pick-up—or of a relatively simple nature such as a resistance strain gauge or thermometer element, bolometer, or reactive gauge element. Throughout this specification all forms of such devices will, for convenience, be referred to as gauges. Such gauges may be designed for measuring physical effects such as strain in a test piece, temperature, humidity, light intensity, frequency, magnetic field, or other physical phenomena, as desired.

It is common practice to connect a strain gauge in one arm of a Wheatstone bridge and to supply such a bridge with direct or alternating current, the voltage appearing across the galvanometer diagonal being measured, and the ratio between the input and the output voltage being a measure of the change in mechanical strain in the test piece or element. In such an arrangement, however, especially when the circuit is supplied with direct current, discrimination of the system depends upon the sensitivity of the detecting instrument or apparatus in the galvanometer diagonal. In particular, where an amplifier is used, difficulties are experienced in practice in maintaining a steady reference value of input voltage. This difficulty is partly overcome by the use of an alternating current supply, but in this case the bridge must be balanced both resistively and reactively and there are added difficulties in the nature of stray capacities and harmonics in the supply.

It has now been found that these difficulties can be minimised or overcome by the use of a pulsed electrical input to the bridge, a suitable amplifier and detector being used in the galvanometer diagonal. When thus operated the bridge is more easily balanced than when excitation is by a continuous high frequency, and, when the input is pulsed D. C., the sign of the output voltage is shown directly, which is of special advantage in single gauge measurements. In addition, the pulse operation simplifies simultaneous measurements at a number of different positions by facilitating the display of the data being measured on a cathode ray tube, and in such cases pulsed high frequency current can be applied to the bridge in place of pulsed direct current. With either form of excitation a balanced transformer arrangement of the circuit can be used in place of the bridge circuit.

It is an object of the present invention to provide an improved method of an apparatus for the electrical measurement of strain in a test piece or member, or for the measurement of other physical effects which, by the use of known transducing devices, can be measured in terms of electrical impedance. In particular, but not exclusively, the invention provides a method of and apparatus for the simultaneous measurement of physical effects at a number of points, as for example strain in different positions on a test piece or member, or in different test pieces or members, without excessive complication or duplication of detecting and indicating apparatus.

According to the present invention, electric oscillations having a predetermined relationship to a given physical effect are produced by feeding to a gauge a series of pulses of electrical energy at a relatively high repetition frequency, exposing the gauge to the said effect, so as to modify a characteristic of the said pulses which is variable with changes in the physical effect, and indicating or measuring the said characteristic.

The characteristic of the pulse which is selected for measurement will depend upon the design of the apparatus, but will normally be its magnitude. Other characteristics may, however, be measured, for example, width or phase.

Preferably, the changes in characteristic of the pulse are visually indicated, a convenient visual indicator for this purpose being a cathode ray tube.

Advantageously, a plurality of gauges are mounted in different positions and are fed in turn with pulses. These pulses, as modified by changes in the gauge circuit, may be indicated on separate indicating instruments, or they may be simultaneously applied to the same instrument, for example, to a single cathode ray tube.

The pulses fed to a gauge may be produced either by amplitude modulation of a D. C. or of an A. C. supply, and the modulation may be 100%. Alternatively, pulses may be constituted by successive periods of frequency modulation of an alternating current, and in the latter case, where a plurality of gauges are used, each gauge may be connected to the source of pulse generation through a band-pass filter circuit which accepts a distinctive frequency range only, and the alternating current wave may be, for example, continuously frequency modulated from an initial to a final value, the modulation being then rapidly returned to the initial value.

The invention also provides apparatus for carrying out the above described method comprising a gauge adapted to be subjected to the physical effect to be measured, a pulse generator, means for feeding pulses from the generator to the gauge, and means for measuring or indicating the change in a characteristic of the pulses with changes in the physical effect.

Where the physical effect which it is desired to measure occurs in a member which is relatively inaccessible—for example, where it is constituted by the temperature or strain in a moving member such as a propeller blade on an aircraft in flight— the means for feeding the modified pulses from the gauge or gauges to the measuring apparatus may include a cable or radio transmitting and receiving system, the pulses to be measured being transmitted as modulation of the carrier wave. Several gauges may be fed with pulses from a fixed location through a common cable connection, or each gauge may be separately fed with pulses by means of a capacitive or inductive coupling.

The invention further envisages a construction of gauge wherein the gauge element is designed as a matched termination for a co-axial cable. Where the gauge element is a resistance, the latter may be constituted by a conducting film or layer deposited on or secured to the elastic insulating carrier, and a conducting sheath surrounding the element.

Various ways of carrying the invention into effect will now be described by way of example only with reference to the accompanying drawings in which:

Fig. 7 is a diagrammatic representation of a circuit for effecting the control of the zero of a measuring bridge and also the control of its sensitivity;

Fig. 8 is a circuit diagram of a measuring bridge for measuring frequencies;

Fig. 9 is a block diagram illustrating a multi-gauge equipment which is operated by high frequency pulses;

Figs. 10a and 10b illustrate alternative waveforms for use in the circuit arrangement of Fig. 9;

Figs. 11 and 12 show alternative forms of balanced gauge circuit to that shown in Fig. 2, and Fig. 13 illustrates diagrammatically a system for measuring strains in a propeller blade of an aircraft in flight, and Figs. 14, 15 and 16 show alternative constructions of resistance gauge element.

In the subsequent description of ways of carrying the invention into effect, although specific reference will be made to resistance strain gauges, it is to be understood that resistance or reactance gauges for measuring other physical effects besides strain—e. g. temperature, humidity—may be used in place of the strain gauges, with obvious modifications where necessary.

Figure 1:
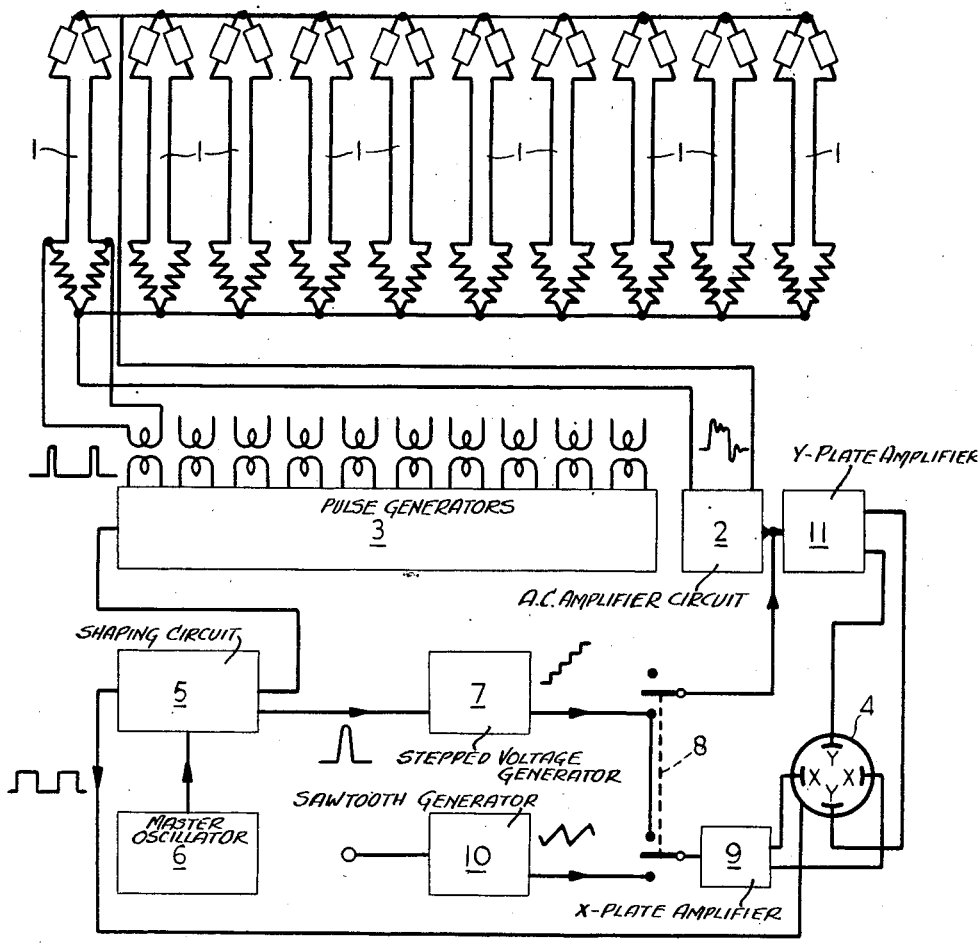
Fig. 1 is a diagrammatic representation of the circuit arrangement of a multi-gauge equipment.

The equipment shown in Fig. 1 consists of ten similar measuring bridge circuits 1 having their outputs connected in parallel and to an A. C. amplifier circuit 2 whilst their inputs are fed respectively from a series of ten synchronised pulse generators 3. In a typical arrangement, the pulse repetition frequency of each generator is 10 kc./s. and the generators are connected to operate in sequence, an eleventh pulse generator circuit being included in the ring 3 which provides a dwell period or interval of one pulse duration during which flyback of the time base of a cathode ray tube indicator 4 may take place. Furthermore, since the amplifier 2 has a finite time constant, which tends to cause drift of the zero level, the interval in each cycle of sequential operations is utilised to restore the amplifier output to zero, as will be described below.

Figure 3:
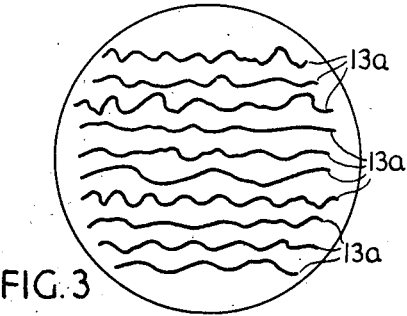
Fig. 3 illustrates an alternative form of display in which the trace produced by each gauge is expanded horizontally and displaced vertically with respect to the other traces.
Figure 4:
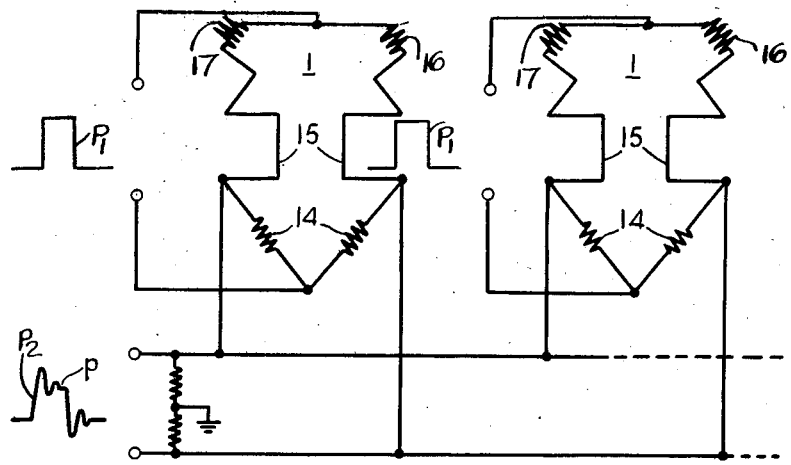
Fig. 4 is a circuit diagram of a simple measuring bridge showing typical input and output pulse waveforms.

The shape of each pulse is regulated by a shaping circuit 5 which is controlled by a master oscillator 6, whilst another output from the shaping circuit 5 is used as a brightening pulse for the cathode ray tube 4. The timing and duration of the brightening pulse is adjustable so that the initial disturbed portion of the output pulse, due to stray reactances or pick-up in the circuit, is left dark and the trace is brought to the desired brightness only during the period of the plateau $p$ (Fig. 4). A third output from the shaping circuit keeps in synchronism a stepped voltage generator 7 whose output may be applied to either the X plates of the cathode ray tube 4—to produce a display such as that shown in Fig. 2—or to the Y plates so as to produce a display as shown in Fig. 3. A change-over switch 8 is provided to enable the selection to be made. When the latter is set in the position for the display of Fig. 3, a sawtooth time base is applied to the X plates, through the X-amplifier 9, from a sawtooth generator 10, whilst the stepped voltage is applied to the Y plates through the Y-plate amplifier 11.

Figure 2:
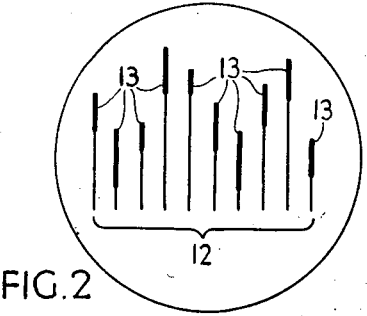
Fig. 2 illustrates a typical display on the cathode-ray tube of the circuit shown in Fig. 1.

In the display illustrated in Fig. 2, each vertical trace 12 corresponds to the output of a gauge in a respective bridge circuit 1, the amplitude of each upper portion 13 of a trace representing the extent of variation in value of the physical property being measured whilst the mean height of the portion 13 above the common zero line of the traces represents the mean value of the physical effect. Thus variations in a physical property (e. g. temperature, strain) in different parts of a member or structure may be simultaneously measured and their relative proportions readily observed.

In some cases it may be desirable to study more closely the nature of the variations of the physical effect which are represented by the amplitudes of the several portions 13 of the traces shown in Fig. 2. For example, where the effect being measured is the strain in a vibrating member, such as an aircraft propeller blade, the frequency of the time base sweep voltage will be lower than the group repetition frequency of the pulses fed to the gauges 16, and may be synchronised with the period of vibration in the test piece. By this arrangement the configuration of a desired set of vibrations of the test piece will be displayed as a stationary pattern 13a. Each trace is composed of a succession of spots whose height above a datum line is a measure of the strain. With suitable speeds of scan the spots can be made effectively contiguous so as to form a wavy line, conforming to the wave form of the mechanical vibration in the test piece.

For this purpose, the switch 8 is moved to the lower of the two positions shown in Fig. 1 to apply the stepped voltage output from the generator 7 to the Y plates of the cathode ray tube 4. The increments in the stepped voltage are synchronised by means of pulses from the pulse-shaping circuit 5 with the pulses produced by the pulse generators in the circuit 3 so that the spots of each trace 12 corresponding to the output of a respective bridge 1 are shifted vertically with respect to those of the remaining traces 12 and at the same time are spread by the time base sweep voltage so that each portion 13 appears as a horizontally expanded trace 13a (Fig. 3). The characteristics of the variations in amplitude of the physical effect being measured can thus be inspected in detail.

For photographic recording it is preferable to remove the time base voltage from the X plates of the tube and to traverse the sensitive film at a convenient speed instead.

By the use of gating circuits any one of the several series of pulses corresponding to particular traces can be selected and applied to an external measuring apparatus such as a meter or recorder.

Each bridge circuit 1 is arranged in the form illustrated in Fig. 4 in which the fixed ratio arms 14 are composed of pure resistances which are located at any convenient position in the equipment. These arms are connected by a line 15, which may be balanced or screened, to the other two arms of the bridge 1, these arms consisting of a gauge element 16 and a compensator 17 which are so arranged that the gauge element 16 is subjected to the physical effect being measured whilst the compensator 17 is not so subjected but has electrical characteristics identical with those of the gauge element 16 under predetermined conditions. Such an arrangement is well known in the art.

The bridge 1 is supplied with a rectangular pulse $P_1$ of direct current of short period and a pulse $P_2$ emerges from the opposite diagonals of the bridge, of amplitude dependent on the degree of unbalance of the bridge circuit 1. Due to the combination of resistance, inductance and capacitance that exists in any practical circuit, the emerging pulse $P_2$ will be modified in shape. Thus, depending on the condition of the bridge circuit 1, the initial part of the pulse may be rounded off, or alternatively, and as shown, may overshoot and decay to a plateau $p$.

The pulse generator circuit 3 consists, in the ten-gauge arrangement shown in Figure 1, of eleven stages (see Fig. 5), of which ten are identical and are connected to respective bridge circuits 1 whilst the eleventh stage acts as a delay or interval stage during the operation of which the D. C. level of the amplifier may be restored. This interval also enables the fly-back of the time base voltage circuit to take place so that the cathode-ray tube display is kept in step with the outputs of the several bridge circuits 1 and neither of the end traces 12 is masked. Each pulse generator circuit consists of a double triode valve 18 which is connected as a flip-flop circuit, one anode 19 being connected to the first bridge circuit 1 (shown diagrammatically in Fig. 5) and to the subsequent stage through a condenser 20. The circuit of each valve 18 is arranged to provide an energising pulse having a duration of one eleventh of the time of one complete cycle of operation of the circuit 3, and the arrangement is such that each output pulse serves to trigger the subsequent stage so that the pulses follow in sequence from the first stage to the eleventh which, in turn, is operative to trigger the first stage at the commencement of its next cycle of operation. Each bridge circuit 1 is thus energised in turn by a pulse and only one bridge is energised at a time. During the period when the eleventh stage is generating its pulse, no bridge is excited and there is no input to the amplifier 2.

A pulse of short duration is generated in the pulse-shaping circuit 5 (Fig. 1) and applied to the pulse generator circuits 3 through a tapping 21 (Fig. 5) on the common cathode of the pulse generators 18. This pulse is timed to occur at the instant of commencement of the energising pulse at each anode 19 and serves to sharpen the outline of the wave-form and also to ensure that the pulse generator circuits 18 keep accurately in step.

Figure 5:
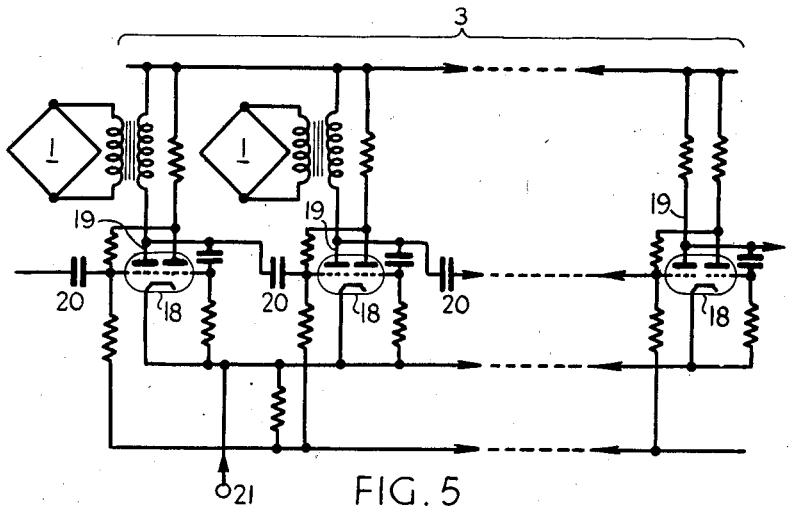
Fig. 5 is a detailed circuit diagram of part of a pulse generator circuit used in the equipment illustrated in Fig. 1.
Figure 6:
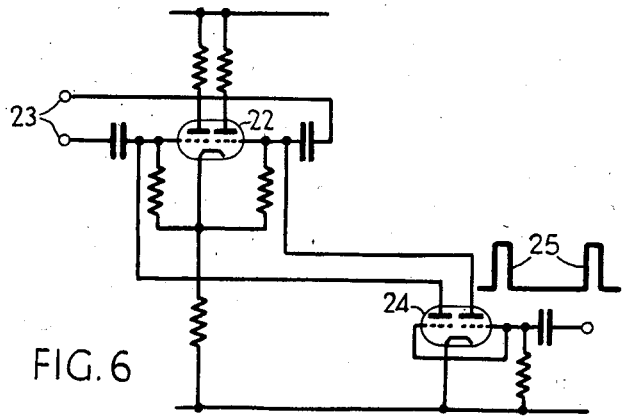
Fig. 6 shows an amplifier stage with which is associated a zero correcting circuit for counteracting the tendency for zero drift in the A. C. amplifier used in Fig. 1 due to its finite time constant.

Since the amplifier 2 is of the A. C. type, it has a finite time constant and this produces a tendency for drift of the zero level of its output. In order to correct this tendency to drift, a clamping circuit is connected to a stage of the amplifier, preferably the final stage. Such a circuit is illustrated in Fig. 6. In the figure, the last stage of the amplifier is represented as a double triode valve 22 fed by a symmetrical input 23. Each grid of the double triode 22 is connected to the anode of a clamp valve 24, the grids of which are strapped together and are fed with pulses (indicated at 25) which may be derived from the anode 19 of the eleventh stage of the pulse generator circuit 3 (Fig. 5). The clamp valve 24 serves to earth the grids of the valve 22 once during each cycle of operations of the pulse generators 3 and hence restores the zero level of the amplifier output.

In order to adjust the zero level of each bridge circuit 1, the input pulse may be fed in through the slide of a potential divider 26 which connects adjacent arms of the bridge (Fig. 7). Each bridge 1 is individually adjustable by the zero adjustment 26 so that the traces 12 on the cathode-ray tube 4 can be brought into correct register. The sensitivity of each bridge is also adjustable, for example, by means of one or more variable resistances 27 connected in the output circuit.

Although the bridge circuits have been illustrated as connected in parallel, it is to be understood that they may, if desired, be connected in series or coupled by transformers.

Fig. 8 illustrates a bridge circuit 1a for measuring frequencies. In this circuit the gauge is constituted by a thermistor 16a or other element whose resistance is a function of the current in it, and a resonant circuit 28, 29 is connected across one of the diagonals of the bridge. The inductance 28 is centre-tapped and the centre tap 30 is connected to the other end of the thermister 16a. Such a bridge is only balanced when the voltage developed across the resonant circuit 28, 29 is zero. The supply to be analysed is applied to a coupling winding 28a, and the resonant circuit 28, 29 responds to the presence of any component of the supply having a frequency equal to the resonant frequency. The resultant voltage developed across the thermistor 16a modifies its resistance and unbalances the bridge 1a, the extent of this out-of-balance being a measure of the amplitude of the component having the frequency concerned. In the resultant display of the kind illustrated in Fig. 2, the vertical lines 13 correspond in amplitude to the strengths of the frequency components to which the circuits 1a are respectively tuned. From the kind of display illustrated in Fig. 3 can be determined any amplitude modulation on any one of the frequency components since it will appear as an undulation of the corresponding line 13a.

The thermistor 16a or other device does not change in resistance appreciably during the period of the relatively short measuring pulse applied to the bridge 1a, because its rate of response is too slow. Thus the presence or absence of the pulse itself does not affect the balance of the bridge. Such a circuit can be used to give a frequency or harmonic analysis by feeding a plurality of bridges 1a as described above in parallel from the source to be analysed.

The display and measuring circuits described above can be used with gauges that convert other physical effects into changes of resistance or reactance. For example temperature is measured by inserting a resistance thermometer in one or both of the bridge arms 16, 17 of Fig. 4. Humidity can be measured with a gauge comprising a conducting strip of absorbent material. Illumination can be measured by using a suitable photo-conductive cell as the gauge 16, and magnetic field strength by the change in resistance of a bismuth wire gauge. A multi-channel measuring system can be used to measure simultaneously a number of different physical effects at a remote point.

Figures 9 and 10 illustrate an alternative method of operating the bridge. In the methods already described, direct current pulses have been employed. In the arrangement shown in Fig. 9, however, alternating current pulses are employed.

The several bridge circuits 1 are supplied from a common frequency-modulated oscillator 30 through respective band-pass filters 31 each tuned to accept a characteristic frequency band. The frequency bands of the filters are selected to lie within a certain range, say 500 to 1000 kc./s., each filter 31 being designed to accept a different characteristic frequency band, and the oscillator modulation is increased, continuously or in steps, from 500 to 1000 kc./s. over a period of, say, 100 microseconds, returning to 500 kc./s. in, say, 10 microseconds. The filters 31 thus operate as selector switches to energise their associated bridges 1 for that period of each cycle during which the modulation is passing through their respective frequency bands.

The waveform of a typical modulation is illustrated in Fig. 10A. The frequency progressively increases from O to P, and then suddenly drops to the original value as at O, the cycle of variation being repeated indefinitely. Each cycle of frequency variation is subdivided into groups or bands OA, AB, ... GH, HP, each having a band width corresponding to the band width of a respective filter 31. Each frequency band OA, AB, ... thus appears across the appropriate bridge circuit 1 as a pulse of relatively short duration.

Fig. 10B shows how the waveform of Fig. 10A can with advantage be amplitude modulated between successive frequency bands OA, AB ... HP in Fig. 10A to give short periods of zero or substantially zero amplitude which serve to render the several frequency bands more discrete and of steeper wavefront. The leading and trailing edges of the pulse are thus sharply defined by the amplitude modulation in order to reduce the period of rise and decay of current through the filter 31. Piezo-electric crystal resonators may be used in place of the band-pass filters 31 if preferred. The frequency modulation is kept in step with the time base of the cathode-ray tube 4 by means of a connection from the time base circuit 10. The outputs of all the gauge circuits 1 are connected in parallel to a common amplifier 2 and applied to the cathode-ray tube 4, as in the circuit of Fig. 1.

Figs. 11 and 12 show alternative arrangements of the measuring circuits 1. In Fig. 11 the bridge 1 is replaced by a pair of balanced transformers 32 having mechanical means (indicated at 33) for varying their ratios. In Fig. 12, two exactly similar capacities 34 have movable third plates 35. Either circuit arrangement is suitable for the measurement of linear or angular displacements, the parts 33, 35 being coupled to the members whose relative displacement is to be measured.

The resistance bridge circuit illustrated in Fig. 4 may be replaced by any known type of reactance bridge. For example, the gauge element 16, may be a condenser, and may be so constructed that the value of capacitance is varied by mechanical motion or displacement in the gauge, in a known manner. The form of the output pulse will be similar to that shown at $P_1$ in Fig. 4 provided that the time constant of the bridge circuit 1 is not less than the period of the pulse, and preferably is at least ten times longer.

The bridge elements 16, 17 may be inductances, and one or both may be so constructed that mechanical movement of a ferromagnetic core varies the inductance. In this case, when a rectangular pulse is applied to the bridge, the output pulse across the opposite diagonals rises to a maximum and decays exponentially. The rectangular form of pulse for which the display apparatus is designed may be restored by inserting a differentiating circuit between the bridge 1 and the amplifier 2. The differentiating circuit may be constituted by a small capacitor in series with one or both of the output leads, the time constant of the capacitor and the circuit load resistors being less than the period of the pulse.

In using either capacitive or inductive bridge arms there will be undesired components of reactance or resistance. These are eliminated by measurement on the plateau $p$ of the pulse $P_2$ (Fig. 4) as already described.

The method according to the invention has certain advantages in applications where the effects to be measured are in relatively inaccessible members such as rotating or other moving parts since connection may be made to a gauge by means of capacitative or inductive couplings; and where pulses are obtained by modulation of an alternating current, separate inductive or capacitative couplings are not necessary for each of the channels to gauges on the rotating or moving body. The frequency selective circuits can be carried on the moving body so that only an outward and a return path is required for signals from say ten strain gauges, and these paths may be by radio link. For example, and as shown in Fig. 13, where it is desired to measure the strains at various points of a propeller blade 36 of an aircraft 37 in flight, it is possible to couple the strain gauge bridges 1 and band pass filters 31 of a circuit such as that shown in Fig. 10 to the measuring apparatus 4 without the use of brush contacts on the propeller shaft. The components of the bridges 1 and filters 31 can be mounted directly on the propeller blade as indicated in Figure 13, which also illustrates how a telemetering system may be employed between the aircraft 37 and a ground station 38. In the figure, a frequency modulated oscillator 30 of the kind used in Fig. 10 is coupled to the series of band pass filters 31 and the measuring bridges 1 by means of leads 38 passing through the propeller shaft 39 and connected at their inner ends to insulated slip rings 40 which form the one plate of a condenser whose other plates 41 are connected to the output of the oscillator 30. A similar capacity coupling 42, 43 connects the gauge output leads 44 to an amplifier 2a whose output is fed through a transmitter 45 to an aerial 46. The transmitter modulates a carrier wave with the output pulses.

An aerial 47 at the ground station 38 receives the radiated wave from the aircraft and passes it to a receiver 49. The receiver output is split, and part is fed to an amplifier 2b which applies the amplified gauge output pulses to the Y plates of the tube 4. The other part of the output is fed to a strobe unit 50 and time base 10 and thence to the X plates of the tube 4. The necessity for carrying heavy and delicate control and measuring equipment in the aircraft is thus avoided. In a similar manner, stresses temperatures, or other physical effects can be measured in other rotating, reciprocating or vibrating members from a remote stationary test point. The pulses from particular gauges can, if desired, be separated from those of the remaining gauges, the separated pulses being demodulated and measured on individual instruments. Thus points of a member under test which appear to be subjected to exceptional strain can be more closely observed under working conditions.

An important advantage of the present invention is that it enables an impact of a few microseconds' duration to be measured accurately.

It has been found that the known type of wire resistance strain gauge is satisfactory for pulses of 10 microseconds' duration at a recurrence frequency of 10 kc./s. The plateau $p$ of the pulse $P_2$ in Fig. 4 is then sufficiently long for measurement in the manner described.

The period of initial disturbance of the output pulse $P_2$ can be shortened by reducing the stray reactances in the circuit and by reducing the time constant by using a lower impedance of gauge. It is then possible to use shorter pulses and so display higher frequencies of strain.

One improved wire strain gauge is shown in Fig. 14. It is connected to the rest of the circuit by a twin balanced cable 51, and comprises the known form of zig-zag fine resistance wire 52 cemented on a flexible backing strip or carrier 53. Preferably the resistance of the gauge is approximately equal to the characteristic impedance of the twin balanced cable 51.

Fig. 15 illustrates a similar arrangement using a screened concentric cable 54. The centre conductor 55 is connected to one end of the resistance gauge 52 and the outer screen 56 to the other end. The outer screen 56 which may be of braided copper wire, is extended to form an electrostatic screen 57 about the wire gauge element, and the whole is attached to the flexible metallic or non-metallic backing piece or carrier 52.

In Fig. 16 a twin screened cable 54a is employed and two gauge elements 52, 52a are provided. These form the two arms 16, 17 of the bridge circuit 1 shown in Fig. 4. The element 52 is cemented to the flexible backing piece or carrier 53 and the element 52a is cemented to a backing strip 53a attached to the main backing strip 53 at only one end, so that the element 52a remains unstrained. A flexible metallic screen 57 encloses both gauges and is attached to the backing piece 53.

In the constructions described above the zig-zag wire resistance element may be replaced by a conducting film or layer, so as to improve the electrical characteristics of the gauge as a high frequency termination for the cable by reducing its inductance.

What I claim is:

1. An electrical measuring apparatus comprising a transducing device having an input and an output and adapted when supplied at its input with a pulse of a predetermined waveform to deliver at its output a pulse having separate parts of its waveform displaced in relation to corresponding parts of the waveform of the input pulse by amounts proportional respectively to the value of a quantity to be measured and to electrical characteristics of the transducing device, means for generating pulses of the predetermined waveform and feeding them to the input of said transducing device, and means for measuring only that part of each pulse delivered at the output of said device which represents the value of said quantity.

2. An electrical measuring apparatus comprising a transducing device having an input and an output and adapted when supplied at its input with a pulse of a predetermined waveform to deliver at its output a pulse having separate parts of its waveform displaced in relation to corresponding parts of the waveform of the input pulse by amounts proportional respectively to the value of a quantity to be measured and to electrical characteristics of the transducing device, means for generating pulses of the predetermined waveform and feeding them to the input of said transducing device, means connected at the output of said device for suppressing that part of each pulse delivered at said output which represents the electrical characteristics of the transducing device, and means for measuring that part of each said output pulse which represents the value of said quantity.

3. An electrical measuring apparatus comprising a transducing device having an input and an output and adapted when supplied at its input with a pulse of a predetermined waveform to deliver at its output a pulse having separate parts of its waveform displaced in relation to corresponding parts of the waveform of the input pulse by amounts proportional respectively to the value of a quantity to be measured and to electrical characteristics of the transducing device, means for generating pulses of the predetermined waveform and feeding them to the input of said transducing device, a cathode ray tube connected to the output of said device, and means synchronised with the pulse generator for brightening the beam of the cathode ray tube over that part of each pulse delivered at said output which represents the value of said quantity.

4. An electrical measuring apparatus comprising a transducing device having an input and an output and adapted when supplied at its input with a pulse of substantially rectangular waveform to deliver at its output a pulse having an initial portion representing electrical characteristics of said device and a subsequent portion representing the value of a quantity to be measured, means for generating pulses having said waveform and feeding them to the input of said device, and means for measuring said subsequent portion of each pulse delivered at the output of said device.

5. An electrical measuring apparatus comprising a transducing device having an input and an output and adapted when supplied at its input with a pulse of substantially rectangular waveform to deliver at its output a pulse having an initial portion representing electrical characteristics of said device and a subsequent portion representing the value of a quantity to be measured, means for generating pulses having said waveform and feeding them to the input of said device, means for feeding the output from said device to a cathode ray tube, and a connection from the pulse generator to a beam suppressing electrode of the gun in the cathode ray tube for suppressing the beam during the initial portion of each pulse delivered at the output of said device.

6. An electrical measuring apparatus comprising a transducing device having an input and an output and adapted when supplied at its input with a pulse of a predetermined waveform to deliver at its output a pulse of varying amplitude a first part of which represents electrical characteristics of said device and a second part of which represents the value of a quantity to be measured, means for generating pulses having said waveform and feeding them to the input of said device, and means for measuring the second part only of each pulse delivered at the output of said device.

7. An electrical measuring apparatus comprising a plurality of transducing devices each having an input and an output and each adapted when supplied at its input with a pulse of a predetermined waveform to deliver at its output a pulse having separate parts of its waveform displaced in relation to corresponding parts of the waveform of the input pulse by amounts proportional respectively to electrical characteristics of the transducing device concerned and to the value of a quantity to be measured, means for generating pulses of the predetermined waveform, an electronic distributor connected to the output of the pulse generator, means connecting the inputs of the transducing devices each to a respective output channel of the electronic distributor, a common indicator connected to all the outputs of said devices, and means for rendering the indicator inoperative over that part of each pulse fed thereto which represents electrical characteristics of the respective transducing device.

8. An electrical measuring apparatus comprising a plurality of transducing devices each having an input and an output and each adapted when supplied at its input with a pulse of a predetermined waveform to deliver at its output a pulse having separate parts of its waveform displaced in relation to corresponding parts of the waveform of the input pulse by amounts proportional respectively to electrical characteristics of the transducing device concerned and to the value of a quantity to be measured, means for generating pulses of the predetermined waveform, an electronic distributor connected to the output of the pulse generator, means connecting the inputs of the transducing devices each to a respective output channel of the electronic distributor, means for feeding the outputs from all the transducing devices to a cathode ray tube, and a connection from the pulse generator to a beam suppressing electrode of the gun in the cathode ray tube for suppressing the beam during that part of each output pulse which represents electrical characteristics of the respective transducing device.

9. An electrical measuring apparatus comprising a Wheatstone bridge circuit, an electrical resistance element connected in at least one arm of the bridge circuit and adapted to change in value with changes in a quantity to be measured, an electrical pulse generator for supplying discrete pulses of a predetermined characteristic to the input of said bridge circuit for modification by changes in said element, the pulses after modification having portions representing the value of said quantity and other portions representing inherent electrical characteristics of said circuit, measuring means connected to receive the output of said circuit, and means controlled by the pulse generator for rendering said measuring means inoperative to respond to those portions of the modified pulses which represent inherent electrical characteristics of said circuit.

10. Apparatus for measuring changes in strain comprising a plurality of electrical resistance elements, a plurality of bridge circuits, each said element forming a portion of a corresponding bridge, a pulse generator for sequentially supplying the input of each of said bridge circuits with a discrete energising pulse having a predetermined characteristic for modification thereof by changes in the respective element, the pulse when modified having a portion of an amplitude representing the change in the respective element and another portion of an amplitude determined by inherent electrical characteristics of the corresponding bridge circuit, a cathode ray indicator connected to receive the outputs from all the bridge circuits, and means controlled by the pulse generator for rendering said indicator inoperative to respond to those portions of the modified pulses fed thereto which are determined by the inherent electrical characteristics of the respective bridge circuits.

JAMES GARRETT YATES.

REFERENCES CITED

The following references are of record in the file of this patent:

UNITED STATES PATENTS

| Number | Name | Date |
|---|---|---|
| 1,633,100 | Heising | June 21, 1928 |
| 1,849,827 | FitzGerald | Mar. 15, 1932 |
| 1,858,293 | Darlington | May 17, 1932 |
| 2,081,684 | Stoddard | May 25, 1937 |
| 2,146,862 | Shumard | Feb. 14, 1939 |
| 2,213,357 | Barth | Sept. 3, 1940 |
| 2,267,827 | Hubbard | Dec. 30, 1941 |
| 2,371,988 | Grangvist | Mar. 20, 1945 |
| 2,394,196 | Morgan | Feb. 5, 1946 |
| 2,426,778 | Long | Sept. 2, 1947 |
| 2,444,950 | Nichols et al. | July 13, 1948 |
| 2,445,840 | Rauch | July 27, 1948 |
| 2,453,607 | Wardle | Nov. 9, 1948 |
| 2,457,819 | Hoeppner | Jan. 4, 1949 |
| 2,467,856 | Rich | Apr. 19, 1949 |
| 2,505,072 | Sunstein | Apr. 25, 1950 |